United States Patent
Connor et al.

(10) Patent No.: US 9,667,563 B2
(45) Date of Patent: *May 30, 2017

(54) NETWORK TRAFFIC MANAGEMENT IN HIGH BANDWIDTH APPLICATIONS

(71) Applicant: International Business Machines Corporation, Armonk, NY (US)

(72) Inventors: Samuel R. Connor, Apex, NC (US); Jonathan W. Jackson, Durham, NC (US); Joseph Kuczynski, North Port, FL (US)

(73) Assignee: International Business Machines Corporation, Armonk, NY (US)

(*) Notice: Subject to any disclaimer, the term of this patent is extended or adjusted under 35 U.S.C. 154(b) by 70 days.

This patent is subject to a terminal disclaimer.

(21) Appl. No.: 14/851,136

(22) Filed: Sep. 11, 2015

(65) Prior Publication Data

US 2017/0078219 A1    Mar. 16, 2017

(51) Int. Cl.
*H04L 12/927* (2013.01)
*H04L 12/26* (2006.01)

(52) U.S. Cl.
CPC ........ *H04L 47/801* (2013.01); *H04L 43/0894* (2013.01); *H04L 43/16* (2013.01)

(58) Field of Classification Search
None
See application file for complete search history.

(56) References Cited

U.S. PATENT DOCUMENTS

| | | |
|---|---|---|
| 8,539,094 B1 | 9/2013 | Marr |
| 8,571,024 B2 | 10/2013 | Tatar et al. |
| 2010/0061719 A1* | 3/2010 | Monga ............... H04J 14/0284 398/2 |
| 2011/0096666 A1* | 4/2011 | Davari .................... H04L 47/10 370/235 |
| 2014/0269305 A1 | 9/2014 | Nguyen |

OTHER PUBLICATIONS

Quick, "Closing the gap to improve the capacity of existing fiber optic networks," Gizmag, Apr. 7, 2013, 6 pages http://www.gizmag.com/cudos-fiber-optic-network-capacity/26969/.
Connor et al., "Network Traffic Management in High Bandwidth Applications", U.S. Appl. No. 14/870,186, filed Sep. 30, 2015.
List of IBM Patents or Patent Applications Treated as Related, dated Sep. 28, 2015, pp. 1-2.

* cited by examiner

*Primary Examiner* — Kouroush Mohebbi
(74) *Attorney, Agent, or Firm* — Mark G. Edwards

(57) ABSTRACT

A method for managing data communication traffic in a network routing device includes monitoring a bandwidth utilization of the network routing device and determining whether the bandwidth utilization exceeds a threshold. The method may additionally include receiving a first signal, the first signal having a first bandwidth, the first signal further having stream of packets. A second signal may be generated based on determining that the bandwidth utilization exceeds the threshold. The second signal may include the stream of packets. The second signal may additionally have a second bandwidth, where the second bandwidth is larger than the first bandwidth. The method may be continued by routing the second signal along a loopback path external to the network routing device. The method may then include extracting, based on determining that the bandwidth utilization is at or below the threshold, the stream of packets from the second signal for processing.

13 Claims, 5 Drawing Sheets

NETWORK TRAFFIC MANAGEMENT IN HIGH BANDWIDTH APPLICATIONS

BACKGROUND

The present disclosure relates to data communications, and more specifically, to manage data communication traffic in a computer network during periods of temporary data traffic spikes.

The field of data communications includes exchanging data between disparate computer systems and computer networks interconnected by a network architecture. A network architecture may include network routing devices that route data packets through and/or between computer networks. Network architectures may also include communications links which form the physical channels for conducting the data packets over the network. A network routing device may receive data packets from a computer system or network via communication link coupled to an input interface and route the received data packets to other computer systems or networks via a second communication link coupled to an output interface.

SUMMARY

According to embodiments of the present disclosure, a method for managing data communication traffic in a network routing device includes monitoring a bandwidth utilization of the network routing device and determining whether the bandwidth utilization exceeds a threshold. The method may additionally include receiving a first signal, the first signal having a first bandwidth, the first signal further having stream of packets. A second signal may be generated based on determining that the bandwidth utilization exceeds the threshold. The second signal may include the stream of packets. The second signal may additionally have a second bandwidth, where the second bandwidth is larger than the first bandwidth. The method may be continued by routing the second signal along a loopback path external to the network routing device. The method may then include extracting, based on determining that the bandwidth utilization is at or below the threshold, the stream of packets from the second signal for processing.

Various embodiments are directed towards systems and computer program products for managing data communication traffic in a network routing device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
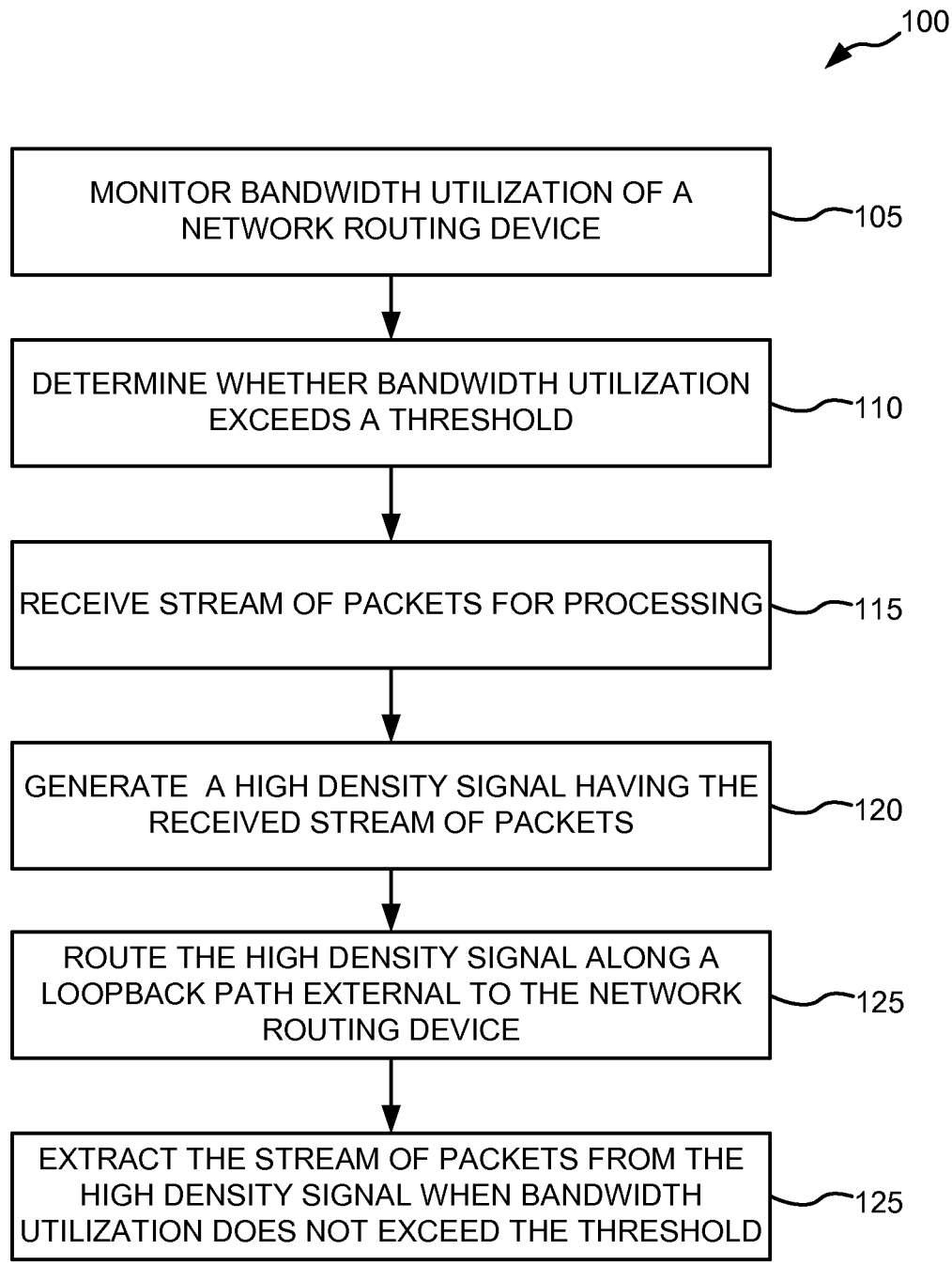
FIG. 1 depicts a flowchart of computer implemented operations for controlling data communication traffic in a computer network during periods temporary data traffic spikes, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer networking, more particular aspects relate to managing communications traffic in a data communication network during temporary traffic spikes. While the present disclosure is not necessarily limited to such applications, various aspects of the disclosure may be appreciated through a discussion of various examples using this context.

The capacity for a data communication network to route data packets between network connected devices may be influenced by the packet processing rate of network routing devices (hereinafter router) and/or by the data carrying capacity of the data communication network's communication links. The packet processing rate of a router may include the rate at which a router receives data packets at an input interface, processes the received data packets (e.g., manipulating the contents of data packets and determining how to route data packets) and provides the processed data packets to a communication link connected an output interface. A throughput of a router may include the proportion of received data packets that are successfully processed and routed along the data communication network. The throughput of a router may increase as the packet processing rate increases. A router may experience periods of throughput saturation when a rate at which data packets arrive at an input interface of the router exceed a maximum packet processing rate of the router. The rate at which data packets arrive at an input interface of a router may be determined by the data carrying capacity of communication links (e.g., the volume of data that may be carried by the communication link within a given unit of time) coupled to the input interface, and by the volume of data being carried by the communication links.

Embodiments of this disclosure are based on the recognition that an increase in the number of devices connected to data communication networks via broadband communication links, coupled with the volume of data produced by these devices, may result in situations where traffic on a data communication network may temporarily increase (or spike) above the data packet processing capacity of a network routing device. These traffic spikes may cause the router to experience throughput saturation. During these periods of throughput saturation, the router may drop/discard data packets that exceed the router's maximum packet processing capacity. Dropping packets may prolong or exacerbate the disruptions caused by the traffic spikes by causing dropped packets to be retransmitted. In addition, retransmitting packets may reduce the throughput and/or efficiency of a data communication network.

The present disclosure provides an architecture (e.g., systems and operations) for controlling network traffic received at a router. The architecture may mitigate some disruptive effects of data traffic spikes. The method includes diverting excess data packets (e.g., received data packets in excess of a threshold packet processing rate of a router) into a high density signal. The high density signal may then be transmitted over an unutilized or underutilized communication link (e.g., fiber optic cables) along a loopback route terminating at an input interface of the transmitting router. The high density signal may be transmitted along the loopback path until the transmitting router determines that conditions in the data communications network have changed sufficiently to enable the transmitting router to process the diverted data packets (e.g., examine and/or route the packets a target destination).

In some embodiments, a high density signal can be a communication signal formed by a set of coherent optical subcarriers configured to form a unified communication channel having a given bandwidth (e.g., a data carrying capacity). A subcarrier may be an optical signal having a wavelength, and modulated at data rates determined by commercially available signal processing components such as analog to digital converters and digital signal processors. Optical subcarriers, for example, may have wavelengths in the C-band of the fiber optic network optical wavelength spectrum (e.g., 1530-1565 nanometer rage of optical fiber wavelengths), and can be modulated to operate at a data rate 100 gigabits per second (Gbps). A high density signal (e.g., a super-channel) may be formed by multiplexing several optical subcarriers within a single strand of fiber. A one terabit-per-second (Tbps) high density signal, for example, may be generated by incorporating ten 100 Gbps subcarriers into a single optical fiber. The modulation of each subcarrier in the high density signal may be synchronized to enable the subcarriers to collectively exhibit characteristics of a unified communication channel having a given engineered bandwidth (e.g., 1 Tbps) during each operational cycle of the high density signal.

In some embodiments, a high density signal may be formed by selecting the wavelengths of constituent subcarriers (e.g., optical subcarriers) so that the channel gap (e.g., the range of frequencies separating each subcarrier) between each carrier is close or equal to the Nyquist bandwidth associated with each carrier. Techniques that enable the creation of high density signals by multiplexing selected subcarriers such that the channel bandgap between the multiplexed subcarriers approaches (e.g., approximates) or equals the Nyquist bandwidth of the subcarriers include orthogonal-band-multiplexed-orthogonal frequency division multiplexing, Nyquist wavelength division multiplexing (WDM), and multi-channel equalization WDM. These techniques, or their equivalents may be used to generate the high density signals described herein.

As used herein, an underutilized communication link may be a communication link, such as a fiber optic cable, whose the full bandwidth potential is not being utilized (e.g., there is enough bandwidth available in the communication link to transmit more data than is currently being transmitted). A communication link having multiple subcarriers (e.g., channels) may be underutilized if the channel gap between the subcarriers is not close to the Nyquist bandwidth. An unutilized communication link may be a communication link where the bandwidth potential is not being used (e.g., no data is being transmitted through the communication link).

A loopback path may be a route taken by a data packet which originates at an output interface of a router, and terminates at an input interface of the same router. In some embodiments, a loopback path may include a single fiber optic cable having a first end coupled to an output interface of a router and a second end coupled to an input interface of the same router. In other embodiments, a loopback path may include two or more fiber optic cables coupled to one or more routing devices to create a path that loops data transmitted by a first router through a second router, and back to the first router.

Referring now to the figures, FIG. 1 depicts a flowchart of computer implemented operations for controlling communications traffic in a data communication network during temporary traffic spikes, according to various embodiments. The operations depicted in the flowchart 100 may be executed by a network routing device or router such as the router 315 of FIG. 3. In certain embodiments, the router may be a computing device (e.g., computing device 500 shown in FIG. 5) configured to route data packets between data communication networks. One or more network management applications executing on a processor of the router may execute or coordinate the execution of the operations of flowchart 100 on the behalf of the network routing device. Additionally, the router may include electrical circuits or computers chips to perform operations of the flowchart 100.

The router may begin the flowchart 100 by monitoring the network bandwidth utilization of the network routing device, according to operation 105. In some embodiments, the network bandwidth utilization may be a measure of the quantity of packets or data being received at an input interface of a router within a given unit of time. In some embodiments, the bandwidth utilization may be monitored by a network management application maintaining a count of data packets received within a given window time in a memory of the router.

The router may then execute operation 110 by determining whether the monitored network bandwidth utilization exceeds a utilization threshold. The utilization threshold may be based on the same metric as the network bandwidth utilization (e.g., a number packets received at an input interface per unit of time). In some embodiments, the utilization threshold may be constant value stored in, for example, a memory of the router. In other embodiments, the utilization threshold may be a value derived from one or more physical and/or environmental characteristics of a router or a data communication network. Examples of these physical and/or environmental characteristics include a buffering capacity of a router, a rate at which a router can process data packets, and network congestion. The utilization threshold may further correspond with a packet processing rate at which the router may experience throughput saturation. In some embodiments, a network management application executing on the router may continuously or periodically compare the network bandwidth utilization to the utilization threshold.

The router may receive a stream of data packets for processing at an input interface, as indicated by operation 115. In some embodiments, the data packets may be received from a computing device coupled to a data communications network. In other embodiments, the data packets may be received from another routing device coupled to the data communications network. Processing the received data packets may include analyzing, by a network management application, header information associated with the data packets to determine how and/or where to route the data packet over the data communication network. Processing the data packets may further include routing the data packets to one or more computing or network routing device.

In some embodiments, data packets received at the input interface of a router may be stored in a memory buffer until they can be processed. A router may remove received data packets from the memory buffer for processing as computing resources become available. The packets may be processed through a packet processing pipeline of the router. The packet processing pipeline may include software applications and/or electrical circuits for examining data packet header information to determine how and/or where to route data packets over the data communication network. During periods of throughput saturation, a network routing device may divert (e.g., bypass the memory buffer and/or packet processing pipeline) a quantity of received data packets into a high density signal, consistent with operation 120. Diverting the quantity of received packets into the high density signal may include moving the quantity of packets to a network interface card or other signal processing element configured to generate high density data signals, as described herein. In some embodiments, the high density signal may be generated by independently modulating a plurality of synchronized lasers with the quantity of data packets. The modulated emission of the lasers may then be converted to optical subcarriers and multiplexed into a coherent high density optical signal by optical inverse Fourier transforms performed by, for example, a wavelength selective switch (WSS) such as commercially available liquid crystal on silicon WSSs.

In some embodiments, a quantity of packets may be diverted into the high density signal without being processed by the network routing device. A network management application executing on the network routing device may, for example, identify (e.g., based on monitoring the bandwidth utilization, as indicated in operation 105) a quantity of packets received during a period of throughput saturation. The network management application may automatically move the quantity of packets to a high density signal generation component or network interface card of a router for diversion into the high density signal.

The router may execute operation 125 by routing the high density signal along a loopback path external to the router. In some embodiments, the router may identify a loopback path by examining internal routing tables to identify routes over communications links that may originate at an output interface of the router and terminate at an input interface of the same router. In some embodiments, the loopback path may be a single fiber optic cable coupled between an input and an output interface of the routing device. In other embodiments, the loopback path may include any underutilized communication link having capacity to conduct the high density signal.

The loopback path, including the underutilized communication links, may be selected to have a data or signal carrying capacity to carry a high density signal capable of providing measurable relief for a router during periods of throughput saturation. For example, when the loopback path is a length of fiber optic cable coupled to an input and an output interface of a router, the length of the cable may be selected to ensure a desired data carrying capacity. In one example, a 10-Tbps high density signal can be formed by multiplexing 252 subcarriers, with each subcarrier having a data bandwidth of 40-Gbps. A loopback path conducting this 10-Tbps high density signals over a communication link having a loop of fiber optic cable with a selected length of 850 kilometers may be able to provide a router temporary relief from having to process up to 3.54-gigabytes of data during a period of throughput saturation. The time duration of the temporary relief may be determined in part by, inter alia, the propagation delay of signals transmitted along the loopback path.

The router may route the high density signal along the selected loopback path by coupling the high density signal to the output interface coupled to the selected loopback path. In some embodiments, the output interface may include signal processing hardware and software applications to generate the high density signal.

The high density signal dispatched from the output interface of a router may return to the same router after a finite amount of time determined, for example, by physical length of communication links in the loopback path (e.g., a length of a fiber optic cable) and the communication links' signal carriers (e.g., photons in the case of fiber optic communication link). In some embodiments, a network routing device may retransmit a high density signal received from a loopback path along the same loopback path (or a different loopback path) when conditions in the data communication network have not sufficiently changed to enable the router to process packets diverted to the high density signal. In certain embodiments, the router may modify the high density signal by, for example, diverting additional data packets into or adding additional subcarriers to the high density signal before retransmitting.

The network routing device may extract the diverted data packets from the high density signal when network conditions have sufficiently changed to enable the network routing device to process the diverted packets, as indicated by operation 125. Network conditions may have sufficiently changed when, for example, the rate at which data packets arrive at an input interface of a router falls below a threshold value. The threshold value may be selected to reduce the packet processing rate of the router to a value below the throughput saturation threshold of the router. The network routing device may then process the extracted data packets, as described herein.

Figure 2:
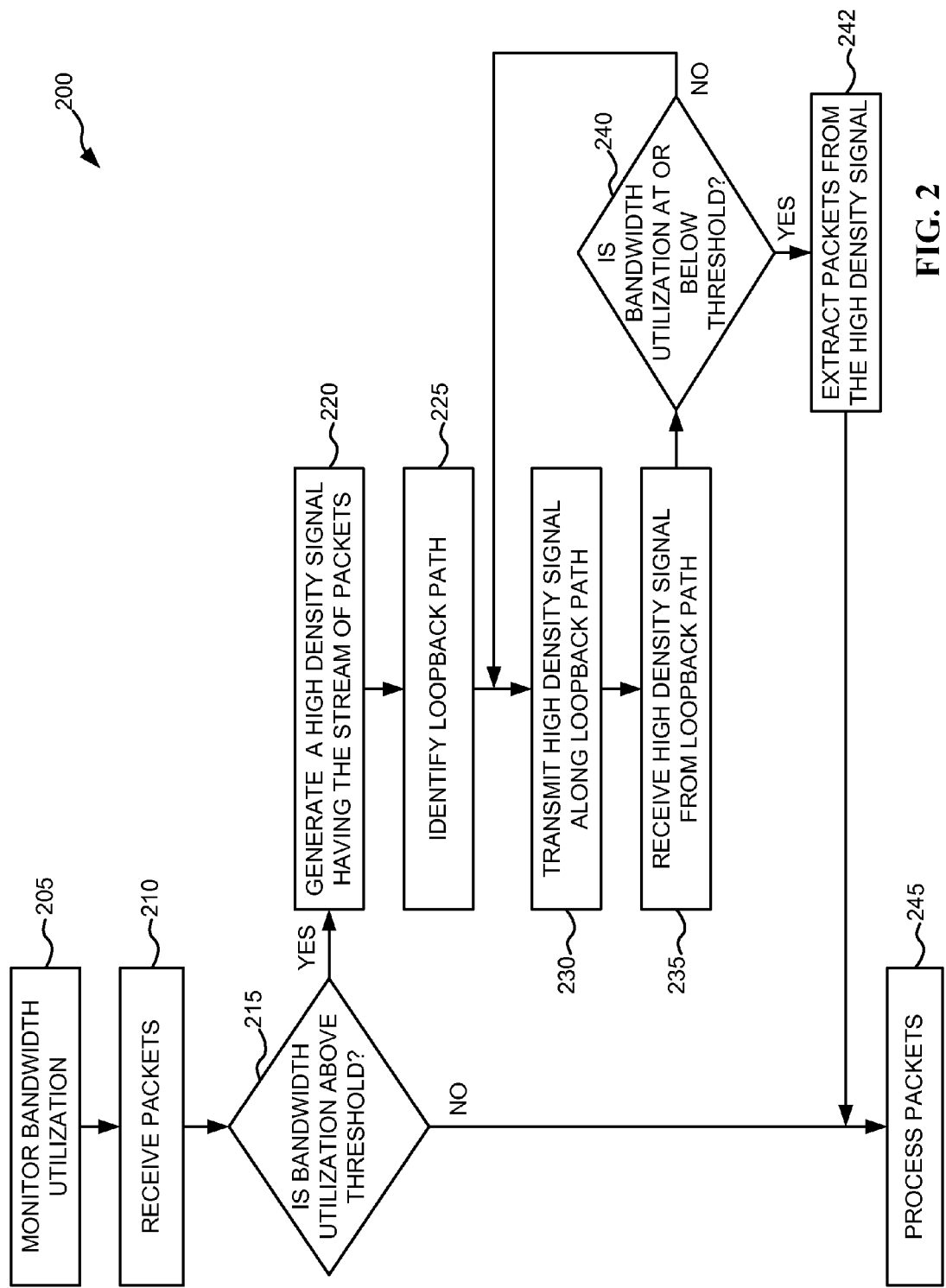
FIG. 2 depicts a flowchart of an example embodiment of computer implemented operations for controlling communications traffic in computer network during periods of temporary traffic spikes, according to various embodiments.

FIG. 2 depicts a flowchart of an embodiment of computer implemented operations for controlling communications traffic in data communication network during temporary traffic spikes, according to various embodiments. The operations depicted in the flowchart 200 may be executed by a router, as described herein. One or more network management applications executing on a processor of the router may execute or coordinate the execution of the operations of flowchart 200 on the behalf of the router. Additionally, the router may include electrical circuits or computers chips to perform operations of the flowchart 200.

Operation 205 may be executed by monitoring bandwidth utilization of the router. Bandwidth utilization may be monitored by the router, or by another computing device or network management application on the behalf of the router, as described in the discussion of operation 105.

The router may continue the operations of flowchart 200 by executing operation 210. Operation 210 may be executed by receiving data packets from an input interface of the router, as described in the discussion of operation 115. In some embodiment a network management application executing on the router may receive the data packets at the input interface and store the received packets in a memory buffer of the router for processing and/or routing.

The router may then proceed to operation 215 and determine whether bandwidth utilization is above a given utilization threshold. A network management application and/or one or more electronic circuits may continuously monitor bandwidth utilization, and compare the bandwidth utilization against the utilization threshold on the behalf of the network routing device, as described in operation 110. When the bandwidth utilization is less than or equal to the utilization threshold, the network routing device may process data packets received in operation 210, consistent with operation 245.

When the bandwidth utilization exceeds a utilization threshold, a router may proceed to operation 220. Operation 220 may be executed by first identifying a set of data packets, received at operation 210, to be diverted from the packet processing pipeline of the router. A high density signal including the diverted data packets may then be generated, as described herein.

A router may continue the operations of the flowchart 200 by executing operation 225. Operation 225 may be executed by a network management application, on the behalf of the network routing device, configured to identify a loopback path originating at an output interface of a router back to an input interface of the same router. The loopback path may be selected and/or identified as described herein.

A router may further continue the operations of flowchart 200 by transmitting and/or routing a high density signal generated in operation 220 along a loopback path identified in operation 225, consistent with operation 230. After a finite time delay, the originating router may receive the transmitted high density signal at an input interface of the originating router, consistent operation 235. The finite time delay may be determined by, inter alia, the length of the loopback path, the number of intervening routing devices in the loopback path, and the medium conducting the communication signal (e.g., copper wire, or fiber optic cable).

At operation 240, a router may determine whether bandwidth utilization is at or below a utilization threshold. In certain embodiments, a router may continue the operation of flowchart 200 at operation 230 when bandwidth utilization is at or below the utilization threshold. In particular embodiments, a router may continue the operation of flowchart 200 at operation 220 when bandwidth utilization is at or below the utilization threshold. Continuing at operation 220 may include modifying or regenerating the high density signal received at operation 235, as described herein. The network routing device may execute operation 242 when the bandwidth utilization exceeds the utilization threshold.

Operation 242 may be executed by extracting diverted data packets from the high density signal. The diverted data packets may be extracted by reversing the process used to create the high density signal. For example, when a wavelength selective switch is used to multiplex subcarriers in a process to from a high density signal, a WSS may be used in the reverse process to de-multiplex or split the subcarriers from the high density signal. The network routing device may then continue the operations of flowchart 200 by executing operation 245, as described herein.

Figure 3:
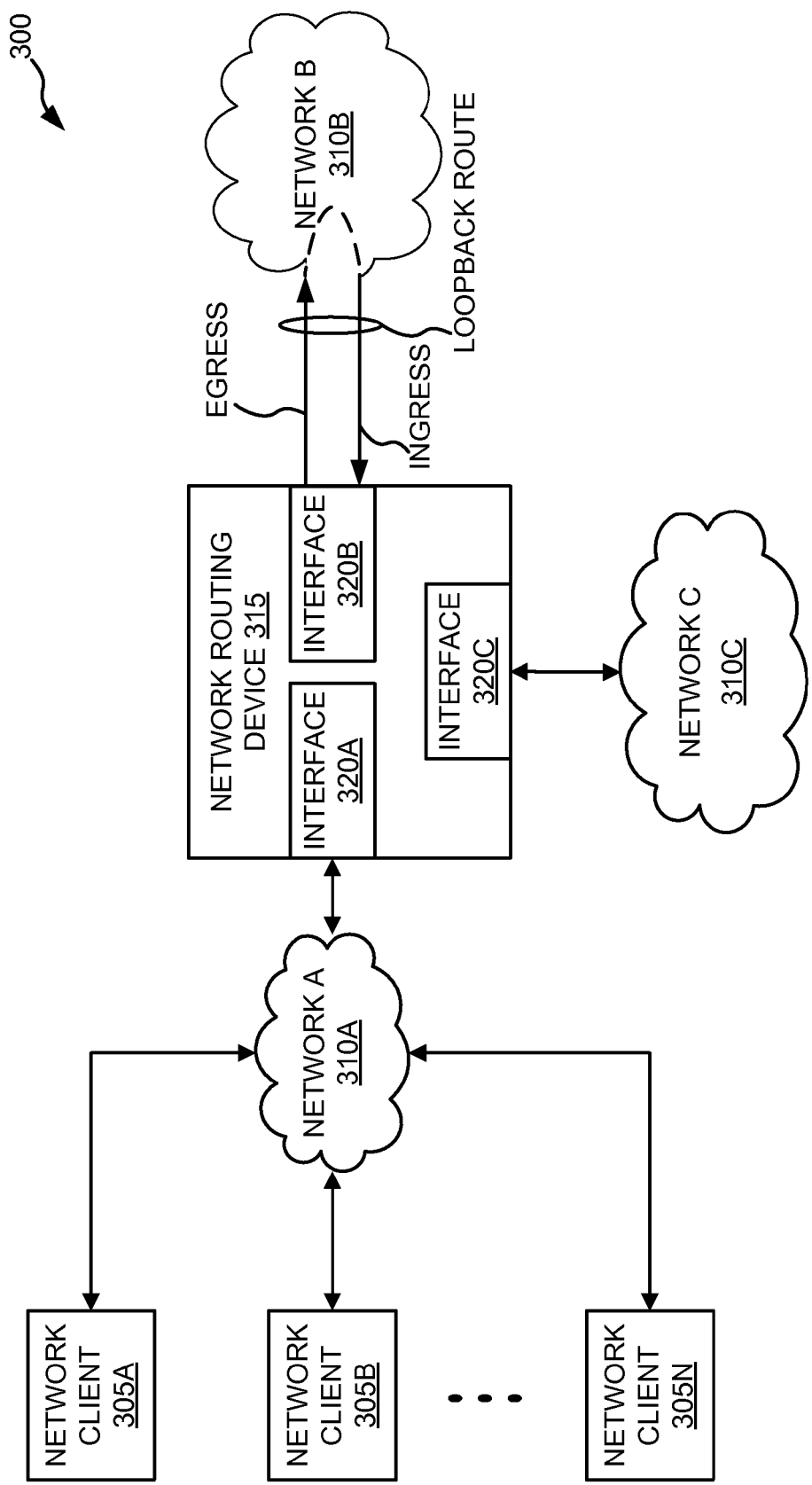
FIG. 3 depicts a block diagram of an exemplary computer network having a network routing device for implementing operations for controlling communications traffic during periods of temporary traffic spikes, according to various embodiments.

FIG. 3 depicts a block diagram of a data communication network 300 having router 315 for implementing operations for controlling communications traffic during temporary traffic spikes, according to various embodiments. The data communication network 300 may include network clients 305A through 305N, local or sub-networks 310A, 310B, and 310C, and router 315. The data communication network 300 may any interconnected network of computing systems configured to exchange digital information using packet switched protocols such as Transmission Control Protocol/Internet Protocol (TCP/IP).

The network clients 305A through 305N may be any combination of computing devices and/or networks of computing devices capable of generating or consuming network traffic in the form of data packets. The network client 305A, for example, may be an internet connected personal computer while the network client 305B may be a network routing device associated with a local area network. Each network client 305A through 305N may generate a volume of data to be routed to other network clients via one or more of router 315 and/or local or sub-networks 310, 310B and 310C.

Local or sub-networks 310A, 310B and 310C may be any packet switched network of computing devices configured to route data packets between network connected computing devices. The local or sub-networks 310A, 310B and 310C my include network switches, routers, and other devices for facilitating the flow of network traffic, including on or more gateway devices for accessing other local or sub-networks.

The router 315 may be any computing device configured to route network traffic between data communication networks such as local or sub-networks 310A, 310B and 310C. In some embodiments, the router 315 may route network traffic between network clients 305A through 305N and/or local or sub-networks 310A, 310B, and 310C. In certain embodiments, the router 315 may receive network traffic in the form of data packets at one or more of network interfaces 320A, 320B, and 320C. The router 315 may then process the received data packets and dispatch/transmit the processed data packets or data packets resulting from the processing of received data packets to one or more local or sub-networks 310A, 310B, and 310C via network interfaces 320A, 320B, and/or 320C.

In some embodiments a network interface 320A, 320B, and/or 320C may include an input interface and/or an output interface. The input interface may be coupled to a first communication link, forming an ingress path for receiving data packets from data communication networks external to the router 315. The output interface may be coupled to a second communication link forming an egress path for transmit data packets to data communication networks external to the router 315. A loopback path may be formed when the egress path is coupled to the ingress path by, for example, another router. The router in this loopback path may be configured to route a high density signal back to the high density signal's originating router. In some embodiments, a loopback path may be formed when the first and second communication link are the same communication links, such as when a single fiber optic cable is coupled to both the input interface and the output interface of a given router.

Figure 4:
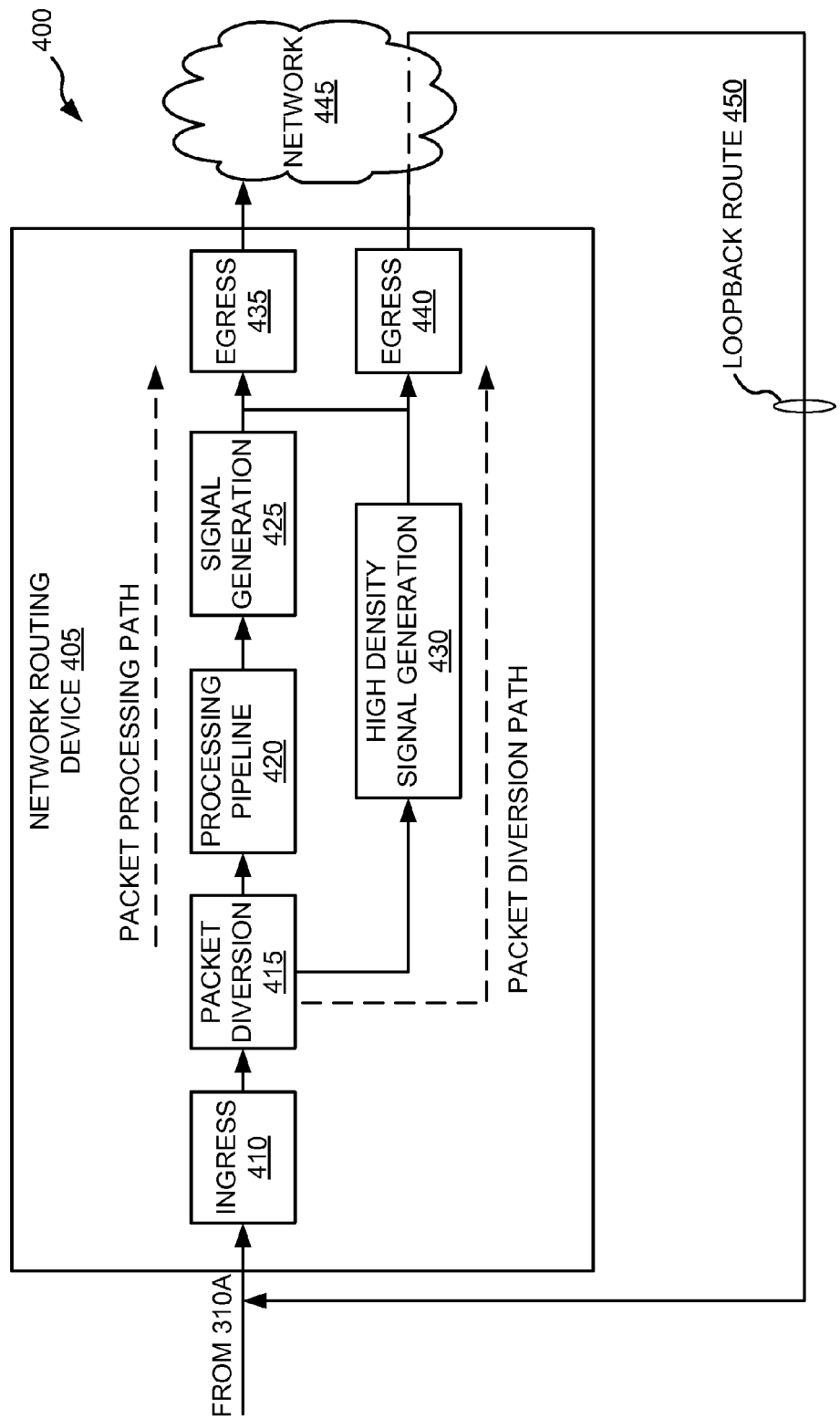
FIG. 4 depicts a block diagram of a network routing device for implementing operations for controlling communications traffic during periods of temporary traffic spikes, according to various embodiments.

FIG. 4 depicts a block diagram 400 of a router 405 for implementing operations for controlling communications traffic during temporary traffic spikes, according to various embodiments. The block diagram includes router 405, data communication network 445, and loopback route 450. The data communication network 445 may be an embodiment of a packet switched data communication network such as local or sub-network 310 of FIG. 3. The router 405 may be an embodiment of the router 315 shown in FIG. 3, configured to implement the operations for controlling communications traffic during temporary traffic spikes, as described herein.

The router 405 may include input interface 410, packet diversion component 415, processing pipeline 420, signal generation component 425, and first output interface 435. In some embodiments, the router 405 additionally include high density signal generation component 430, and second output interface 440. The network routing device 405 may further include a memory for storing computer code and a processor for executing operations of the components described herein. The network routing device may also include electronic circuits for executing operations of the components described herein.

The input interface 410 may receive, as input, data packets from computing devices and/or sub-networks (e.g., local or sub-network 310A of FIG. 3). The input interface 410 may additionally receive data packets from the loopback path 450. The data packets may be received as an electronic signal and/or an optical signal, such as a high density signal as described herein. In some embodiments, the input interface 410 may move the received data packets to packet diversion component 415. In some embodiments, moving the received data packets may include copying the received data packets from a first memory area of the router 405 to a second memory area of the router 415. In some embodiments, the data packets may be extracted from the electronic or optical signal and then moved. In other embodiments, the data packets may be moved within the electronic or optical signals. In other embodiments, moving the received data packets may include directing an electrical or optical signal along a given path within the router 405.

The packet diversion component 415 may receive data packets from input interface 410 as individual data packets and/or as electronic or optical signals. The packet diversion component 415 may determine whether the router 405 has capacity to process the received packets (e.g., determine whether the router is experiencing a period of throughput saturation). In some embodiment, the packet diversion component 415 may provide the received data packets to packet processing pipeline 420 when the router 405 has capacity to process the received data packets. In some embodiments, the data packets may be extracted from the electronic or optical signal before they are provide to the packet processing pipeline 420. Packet diversion component 415 may provide the received data packets to high density signal generation module 430 when the network routing device 405 does not have capacity to process the received data packets.

The packet processing pipeline 420 may receive data packets from packet diversion component 415 and process the received data packets, as described herein. The packet processing pipeline 420 may then forward the processed data packets, including, for example, packets generated from the processing, to signal generation component 425 and high density signal generation component 430.

The signal generation component 425 may receive processed data packets from packet processing pipeline 420 and generate a communication signal modulated by the processed data packets, as described herein. In some embodiments, the data signal may be an electrical or optical signal modulated by the processed data packets. In other embodiments, the data signal may be a data stream including the processed data packets. The signal generation component 425 may then provide the generated data signal for output interface 435 and/or 440. The output interface 435 and/or 440 may receive the data signal and forward it along a communication link to network 445. In some embodiments, the signal generation component 425 and the output interface 435 and/or 440 may be a single integrated component.

The high density signal generation component 430 may receive diverted data packets from the packet diversion component 415. The received diverted data packets may be received as individual data packets and/or they may be included in an electronic or optical electronic signal. In some embodiments, the electronic or optical signal may be a high density signal, as described herein. In some embodiments, when only a high density signal is received at high density signal generation component 430 (e.g., a high density signal received at input interface is being forwarded though another transition through the loopback path 450) the high density signal may be provided to output interface 435 and/or 440. In other embodiments, the high density signal generation component may generate a new high density signal including the diverted data packets, as described herein. The new high density signal may then be provided to output interface 435 and/or 440. In some embodiments, the output interface 435 and/or 440 may be integrated with the high density signal generation component 435 as a single component.

Figure 5:
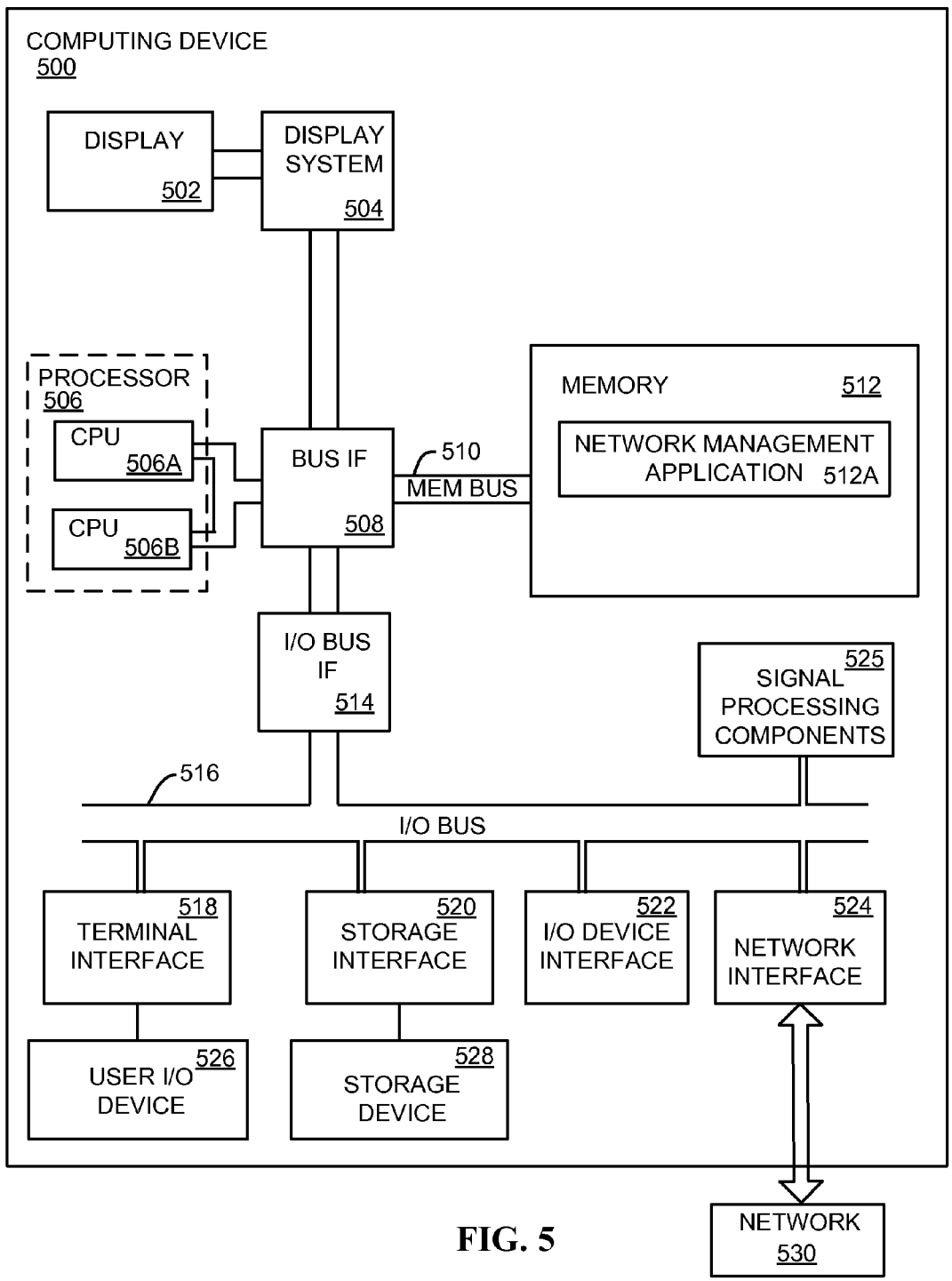
FIG. 5 depicts a block diagram of a computing device with may serve as a network routing device for implementing operations for controlling communications traffic during temporary traffic spikes, according to various embodiments.

FIG. 5 depicts a block diagram of a computing device (e.g., a computing node) with may serve as a router for implementing operations for controlling communications traffic during temporary traffic spikes, according to various embodiments.

The components of the computing device 500 can include one or more processors 506, a memory 512, a terminal interface 518, a storage interface 520, an Input/Output ("I/O") device interface 522, a network interface 524, and signal processing components 525, all of which are communicatively coupled, directly or indirectly, for inter-component communication via a memory bus 510, an I/O bus 516, bus interface unit ("IF") 508, and an I/O bus interface unit 514.

The computing device 500 may include one or more general-purpose programmable central processing units (CPUs) 506A and 506B, herein generically referred to as the processor 506. In certain embodiments, a processor may be any electronic device having a datapath for executing a sequence of programmed instructions and capable of performing arithmetic logic computations (e.g., using an arithmetic logic unit), include application specific integrated circuits, and field programmable gate arrays. In an embodiment, the computing device 500 may contain multiple processors; however, in another embodiment, the computing device 500 may alternatively be a single CPU device. Each processor 506 executes instructions stored in the memory 512.

The computing device 500 may include a bus interface unit 508 to handle communications among the processor 506, the memory 512, the display system 504, and the I/O bus interface unit 514. The I/O bus interface unit 514 may be coupled with the I/O bus 516 for transferring data to and from the various I/O units. The I/O bus interface unit 514 may communicate with multiple I/O interface units 518, 520, 522, and 524, which are also known as I/O processors (IOPs) or I/O adapters (IOAs), through the I/O bus 516. The display system 504 may include a display controller, a display memory, or both. The display controller may provide video, audio, or both types of data to a display device 502. The display memory may be a dedicated memory for buffering video data. The display system 504 may be coupled with a display device 502, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 504 may be on board an integrated circuit that also includes the processor 506. In addition, one or more of the functions provided by the bus interface unit 508 may be on board an integrated circuit that also includes the processor 506.

The I/O interface units support communication with a variety of storage and I/O devices. For example, the terminal interface unit 518 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 526 and the computing device 500, may receive output data via the user output devices. For example, a user interface may be presented via the user I/O device 526, such as displayed on a display device, played via a speaker, or printed via a printer.

The storage interface 520 supports the attachment of one or more disk drives or direct access storage devices 528 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 528 may be implemented via any type of secondary storage device. The contents of the memory 512, or any portion thereof, may be stored to and retrieved from the storage device 528 as needed. The I/O device interface 522 provides an interface to any of various other I/O devices or devices of other types, such as printers or fax machines. The network interface 524 provides one or more communication paths from the computing device 500 to other digital devices and computer systems.

Although the computing device 500 shown in FIG. 5 illustrates a particular bus structure providing a direct communication path among the processors 506, the memory 512, the bus interface 508, the display system 504, and the I/O bus interface unit 514, in alternative embodiments the computing device 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 514 and the I/O bus 508 are shown as single respective units, the computing device 500, may include multiple I/O bus interface units 514 and/or multiple I/O buses 516. While multiple I/O interface units are shown, which separate the I/O bus 516 from various communication paths running to the various I/O devices, in other embodiments, some or all of the I/O devices are connected directly to one or more system I/O buses.

In various embodiments, the computing device 500 is a multi-user mainframe computer system, a single-user system, or a server computer or similar device that has little or no direct user interface, but receives requests from other computer systems (clients). In other embodiments, the computing device 500 may be implemented as a desktop computer, portable computer, laptop or notebook computer, tablet computer, pocket computer, telephone, smart phone, or any other suitable type of electronic device.

In an embodiment, the memory 512 may include a random-access semiconductor memory, storage device, or storage medium (either volatile or non-volatile) for storing or encoding data and programs. In another embodiment, the memory 512 represents the entire virtual memory of the computing device 500, and may also include the virtual memory of other computer systems coupled to the computing device 500 or connected via a network 530. The memory 512 may be a single monolithic entity, but in other embodiments the memory 512 may include a hierarchy of caches and other memory devices. For example, memory may exist in multiple levels of caches, and these caches may be further divided by function, so that one cache holds instructions while another holds non-instruction data, which is used by the processor. Memory 512 may be further distributed and associated with different CPUs or sets of CPUs, as is known in any various so-called non-uniform memory access (NUMA) computer architectures.

The memory 512 may store all or a portion of the components and data shown in FIGS. 1-4. In particular, the memory 512 may store the network management application 512A, along with the modules, scripts and library components used to implement the operations of the present disclosure. The network management application 512A may include computer executable code for performing operations described in flowcharts 100 and 200 of FIGS. 1 and 2. The network management application may additionally include computer executable code for orchestrating and performing operations of the components described in the discussion of FIGS. 3 and 4. The computer executable code may be executed by processor 506. Some or all of the components and data shown in FIGS. 1-4 may be on different computer systems and may be accessed remotely, e.g., via a network 530. The computing device 500 may use virtual addressing mechanisms that allow the programs of the computing device 500 to behave as if they only have access to a large, single storage entity instead of access to multiple, smaller storage entities. Thus, while the components and data shown in FIGS. 1-4 are illustrated as being included within the memory 512, these components and data are not necessarily all completely contained in the same storage device at the same time. Although the components and data shown in FIGS. 1-4 are illustrated as being separate entities, in other embodiments some of them, portions of some of them, or all of them may be packaged together.

The signal processing components 525 may include electronic circuits, signal processing computer chips, and optical components for implementing the operations described herein. The signal processing components 525 may, for example include wavelength selective switches, mode locked lasers, optical delay/phase-shifting circuits, optical signal amplifiers, clock generators, digital signal processors, and analog-to-digital and digital-to-analog converters.

In an embodiment, the components and data shown in FIGS. 1-4 may include instructions or statements that execute on the processor 506 or instructions or statements that are interpreted by instructions or statements that execute the processor 506 to carry out the functions as further described below. In another embodiment, the components shown in FIGS. 1-4 may be implemented in hardware via semiconductor devices, chips, logical gates, circuits, circuit cards, and/or other physical hardware devices in lieu of, or in addition to, a processor-based system. In an embodiment, the components shown in FIGS. 1-4 may include data in addition to instructions or statements.

FIG. 5 is intended to depict representative components of the computing device 500. Individual components, however, may have greater complexity than represented in FIG. 5. In FIG. 5, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 5 may be implemented, in various embodiments, in a number of different ways, including using various computer applications, routines, components, programs, objects, modules, data structures etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer system, comprising:
    one or more computing nodes having a memory and a processor; and
    a computer readable storage medium of the one or more computing nodes having program instructions embodied therewith, the program instructions executable by the processor to cause the computer system to:
    monitor a bandwidth utilization of a network routing device;
    determine whether the bandwidth utilization exceeds a threshold;
    receive a first signal, the first signal having a first bandwidth, the first signal further having stream of packets;
    generate, based on determining that the bandwidth utilization exceeds the threshold, a second signal, the second signal including the stream of packets, the second signal having a second bandwidth, wherein the second bandwidth is larger than the first bandwidth;
    route the second signal along a loopback path external to the network routing device; and
    extract, based on determining that the bandwidth utilization is at or below the threshold, the stream of packets from the second signal for processing.

2. The system of claim 1, wherein the program instructions executable by the processor further cause the computer system to:
    identify an egress path from the network routing device, the egress path including an output interface of the network routing device and a first communication link having capacity to conduct the second signal;
    transmit the second signal along the egress path at a first time; and
    receive, at a second time subsequent to the first time, the second signal at an ingress path into the network routing device, the ingress path including an input interface of the network routing device and a second communication link, the second communication link coupled to the first communication link.

3. The system of claim 2, wherein the first and second communication links are fiber optic cables.

4. The system of claim 2, wherein the first and second communication links are coupled by a second network routing device.

5. The system of claim 1, wherein the second signal is a high density signal.

6. The system of claim 1, wherein the second signal includes a plurality of optical subcarriers to form a single optical channel.

7. The system of claim 6, wherein the program instructions executable by the processor further cause the computer system to:
    synchronously modulate the plurality of optical subcarriers with the stream of packets to provide a given bandwidth during an operational cycle of the second signal.

8. A computer program product for data communication traffic in a networking routing device, the computer program product including a computer readable storage medium having program instructions embodied therewith, wherein the computer readable storage medium is not a transitory signal per se, the program instructions executable by a processing circuit to cause the processing circuit to perform a method comprising:
    monitoring a bandwidth utilization of a network routing device;
    determining whether the bandwidth utilization exceeds a threshold;
    receiving a first signal, the first signal having a first bandwidth, the first signal further having stream of packets;
    generating, based on determining that the bandwidth utilization exceeds the threshold, a second signal, the second signal including the stream of packets, the second signal having a second bandwidth, wherein the second bandwidth is larger than the first bandwidth;
    routing the second signal along a loopback path external to the network routing device; and
    extracting, based on determining that the bandwidth utilization is at or below the threshold, the stream of packets from the second signal for processing.

9. The computer program product of claim 8, wherein the routing further comprises:
    identifying an egress path from the network routing device, the egress path including an output interface of the network routing device and a first communication link having capacity to conduct the second signal;
    transmitting the second signal along the egress path at a first time; and
    receiving, at a second time subsequent to the first time, the second signal at an ingress path into the network routing device, the ingress path including an input interface of the network routing device and a second communication link, the second communication link coupled to the first communication link.

10. The computer program product of claim 9, wherein the first and second communication links are fiber optic cables.

11. The computer program product of claim 9, wherein the first and second communication links are coupled by a second network routing device.

12. The computer program product of claim 8, wherein the second signal is a high density signal.

13. The computer program product of claim 8, wherein the second signal includes a plurality of optical subcarriers to form a single optical channel.

* * * * *